Patented Aug. 16, 1932

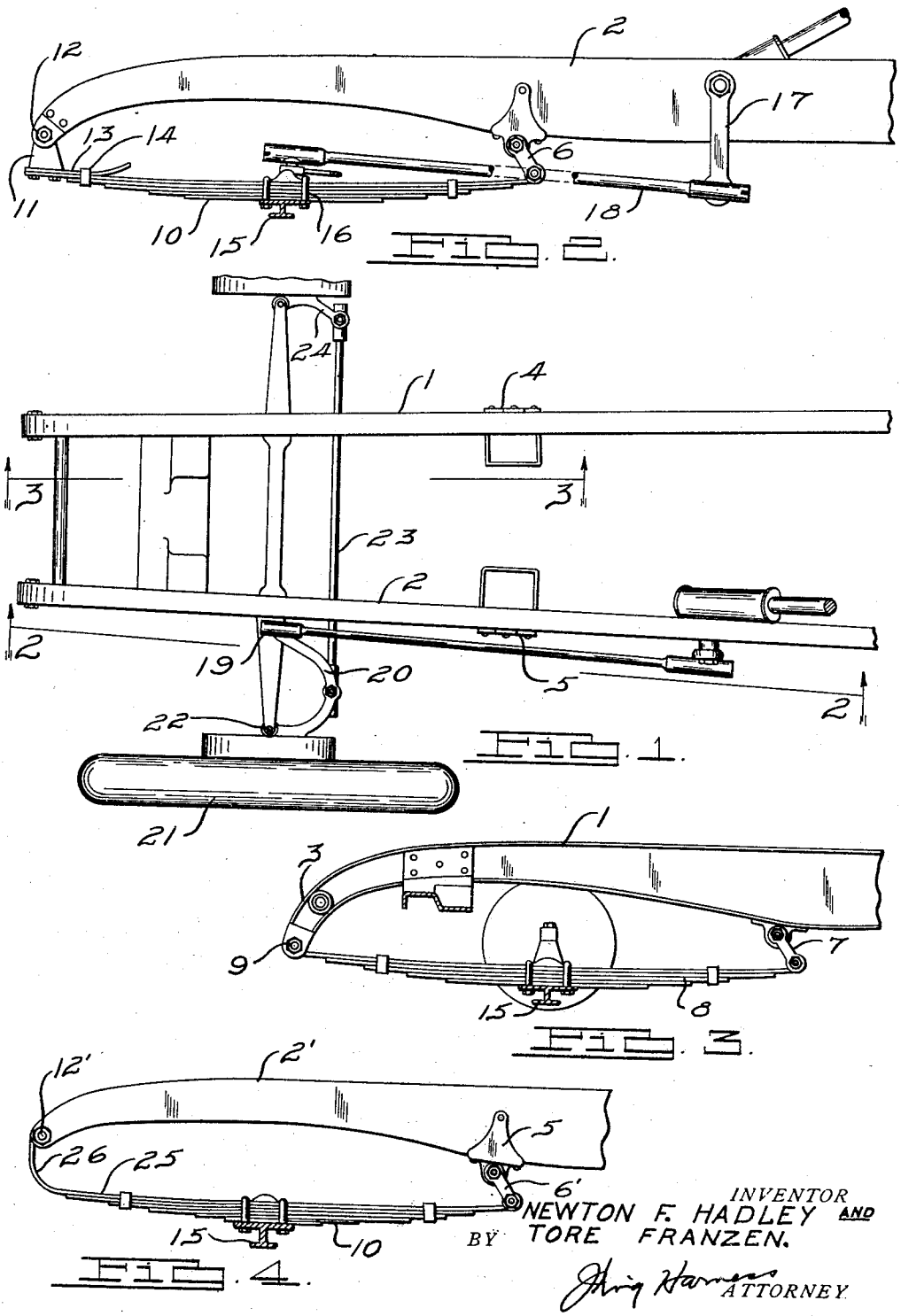

1,872,445

UNITED STATES PATENT OFFICE

NEWTON F. HADLEY, OF BEVERLY HILLS, AND TORE FRANZEN, OF GROSSE PARK POINTE, MICHIGAN, ASSIGNORS TO CHRYSLER CORPORATION, OF DETROIT, MICHIGAN, A CORPORATION OF DELAWARE

FRONT SPRING

Application filed February 1, 1930. Serial No. 425,326.

The main objects of this invention are to provide improved means in a vehicle for obviating shimmy; and to provide an improved spring suspension for the front axle of a vehicle which is adapted to prevent the development of movement of progressively increasing magnitude in the steering apparatus and front wheels thereof.

An illustrative embodiment of our invention is shown in the accompanying drawing, in which:

Fig. 1 is a fragmentary top plan view of a vehicle chassis.

Fig. 2 is a section taken on line 2—2 of Fig. 1.

Fig. 3 is a section taken on line 3—3 of Fig. 1.

Fig. 4 is a side elevation of a modified form of our invention.

In the forms shown in Figs. 1, 2 and 3, the vehicle chassis frame comprises side members 1 and 2 having downwardly curved front extremities 3. Rigidly mounted on the side members 1 and 2, remote from the front ends thereof are brackets 4 and 5 respectively, on which shackles 6 and 7 are journaled. The rear end of a front right hand spring 8 is pivotally supported by the shackle 7 and the front end of the spring 8 is pivotally attached to the front extremity of the side member 1 by a spring bolt 9.

A similar spring 10 is pivotally mounted at its rear end on the shackle 6 of the steering or left side of the frame. Rigidly mounted on the front end of the spring 10 is an arm 11 which is pivotally attached to a spring bolt 12 at the front end of the side member 2. A stiffener 13 is provided between the top leaf of the spring 10 and the arm 11 for strengthening the front end of the spring. This member is firmly secured to the top and second leaf of the spring by a clamp 14.

A front axle 15 is rigidly secured to the intermediate parts of the springs 8 and 10 by U-bolts 16. Pivotally mounted on the left side member 5 of the frame is a pitman arm 17 to which a drag link 18 is pivotally attached. The drag link 18 extends forwardly and is pivotally connected at 19 with a bowed steering arm 20 by which the wheel 21 is rotated about its pivot pin 22 during steering of the vehicle. A tie rod 23 is pivotally connected at one end with the steering arm 20 and at its other end with a steering lever 24 of the left hand wheel.

In the form of our invention shown in Fig. 4, the spring 10' of the steering side 2' of a chassis frame has an upper leaf 25 on which an arm 26 is integrally formed. The arm 26 is pivotally attached to the front end of the side 2' by a spring pin 12' and the rear end of the spring is shiftably connected to a bracket 5' of the side 2' by a shackle 6'.

Although but one specific embodiment of this invention has herein been shown and described, it will be understood that various changes including the size, shape and arrangement of parts, may be made without departing from the spirit of our invention and it is not our intention to limit its scope other than by the terms of the appended claims.

We claim:

1. In a vehicle comprising a chassis frame and a front axle, a spring between said frame and axle, a shackle pivotally connected to one end of said spring and to said frame, a rigid block fixed rigidly to the other end of said spring pivotally secured to said frame and stiffening means including a plate having one end disposed between said block and spring and its other end curved away from the latter, the intermediate part of said plate being clamped to said spring.

2. In a vehicle comprising a chassis frame and a front axle, a spring between the steering side of said frame and said axle, means rigidly clamping said axle on the intermediate part of said spring, a shackle pivotally connected to one end of said spring and to said frame, an arm rigidly mounted on the other end of said spring pivotally secured to said frame, a spring on the opposite side of said frame pivotally secured thereto at one end, and a shackle pivotally supporting the other end of the latter spring on said frame.

3. In a vehicle comprising a chassis frame and an axle, a pair of springs extending longitudinally of said frame and secured intermediate their ends to said axle, shackles pivotally connecting the rear ends of said springs to said frame, means rigid with the front end of the spring of the steering side of said frame pivotally connected with said frame for retaining the front end of said spring in spaced relation thereto.

4. In a vehicle comprising a chassis frame, steering apparatus and a front axle, a pair of springs on the respectively opposite ends of said axle, links pivotally securing the rear ends of said springs to said frame, and a spacing member rigidly mounted on the front end of the spring on the steering side of said frame and pivotally attached thereto, the front end of the other spring being pivoted directly on said frame.

5. In a vehicle including a front axle and chassis frame and having steering apparatus at one side of said frame, a pair of springs extending longitudinally of said frame secured at their intermediate portions to said axle, one located on the steering side of said frame and the other on the non-steering side thereof, shackles pivotally connecting at least one end of each of said springs to said frame, and means rigid with the other end of the spring on the steering side of said frame pivotally connected with said frame for retaining the latter end of the spring of the steering side of the frame in spaced relation thereto.

NEWTON F. HADLEY.
TORE FRANZEN.